United States Patent [19]

Desai

[11] Patent Number: 5,493,105
[45] Date of Patent: Feb. 20, 1996

[54] ELECTRONIC BUSINESS CARD SYSTEM

[76] Inventor: Nimesh R. Desai, 13261 Tiburon Way, Tustin, Calif. 92680

[21] Appl. No.: 229,816

[22] Filed: Apr. 19, 1994

[51] Int. Cl.$^6$ .................................................. G06K 19/06
[52] U.S. Cl. .................................................... 235/375
[58] Field of Search ...................................... 235/375, 380

[56] References Cited

U.S. PATENT DOCUMENTS

| 4,774,618 | 9/1988 | Raviv | 360/2 |
| 4,945,219 | 7/1990 | Tanaka | 235/488 |

FOREIGN PATENT DOCUMENTS

| 4-111193 | 4/1992 | Japan | 235/375 |
| 2242162 | 9/1991 | United Kingdom | 235/375 |
| 4440 | 3/1993 | WIPO | 235/375 |

OTHER PUBLICATIONS

Product brochure for Information Storage Devices, Inc.'s ISD1012A/1016A/1020A Single–Chip Voice Record/Playback Devices, Feb. 1992.

Caton, Michael, "Business–card Scanners Limited, PC Week", p. 69, Feb. 21, 1994.

*Primary Examiner*—John Shepperd
*Attorney, Agent, or Firm*—Knobbe, Martens, Olson & Bear

[57] ABSTRACT

An electronic business card system provides a compact and portable system to read and store business card data from business cards having computer readable data stored on computer readable storage media on the business cards. The electronic business card system utilizes a reader coupled to a computer control system. The electronic business card system also provides organization and manipulation capabilities for the business card data accept by the electronic business card system.

18 Claims, 14 Drawing Sheets

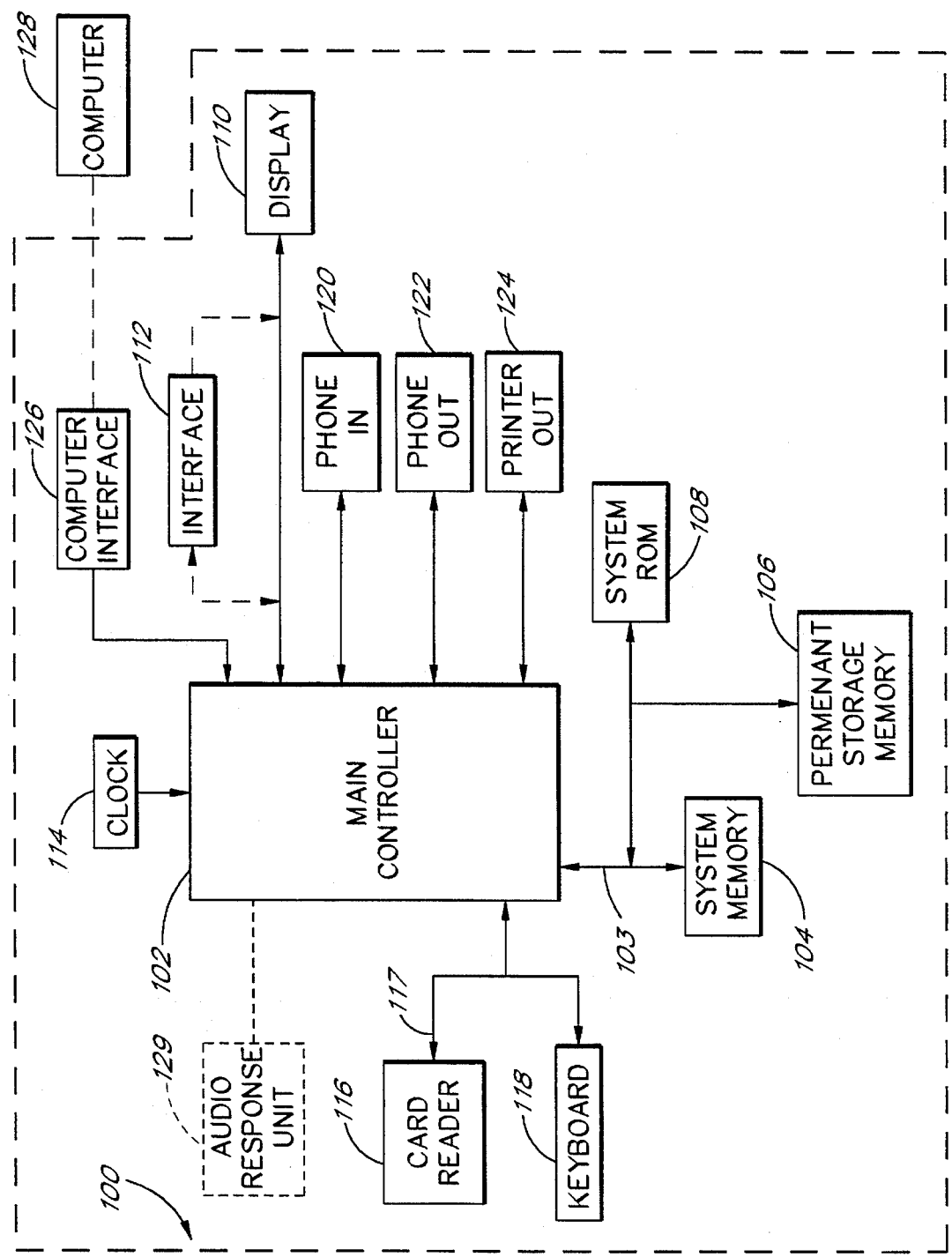

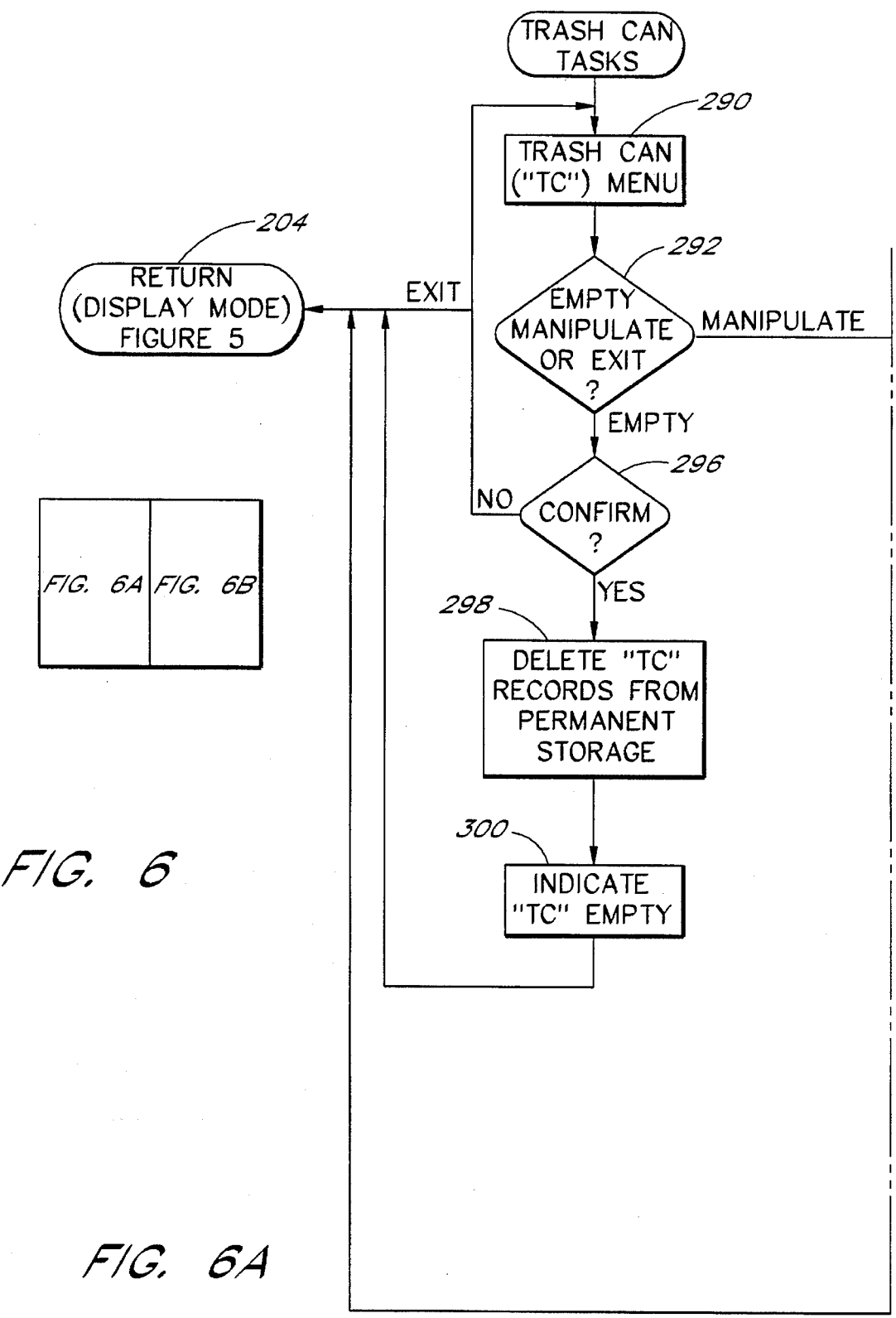

ELECTRONIC BUSINESS CARD SYSTEM

BACKGROUND OF THE INVENTION

1. Field of the Invention

The present invention relates to the field of data storage, retrieval, and organization. More particularly, the present invention involves a system to accept electronic data from a business card (or other information card) having electronic data stored thereon. The system preferably uses a portable card reader, which when integrated with a computer system can be used to organize, store, manipulate, and retrieve the business card information.

2. Description of the Related Art

The use of traditional printed business cards is well understood. However, every time information changes, the business cards require revision. Accordingly, the holder of the card either purchases new business cards, scribbles new information onto old business cards, or fails to use the business cards at all. In addition, initial business and professional meetings commonly involve gathering business cards from acquaintances at the meetings. Indeed, at trade shows the exchange of information has become somewhat standardized by using plastic embossed cards; the plastic cards allow exhibitors and others to take an "imprint" of the plastic embossed card. Thereby, the exhibitors and others collect significant data without having to collect stacks of business cards. Oftentimes, when the information is collected, the information is entered into a conventional office computer manually so that the data can be kept in an organized database format. The user then accesses the database to obtain business information about a contact, make phone calls, generate mailings, and several other functions.

SUMMARY OF THE INVENTION

The present invention provides a novel portable electronic business card reader with a card-file management system for use with novel electronic business cards. The portable electronic business card reader in conjunction with the electronic business card allows for total automation of the common functions that are completed manually with the conventional business card exchanges. The electronic business cards contain the information of a conventional business card (and potentially more or different data) and are easily modified with updated information. Data on a particular electronic business card can be stored by reencoding the data on the business card. The electronic business card reader with its card-file management system allows easy input and manipulation of the information on the business card. The electronic business card system can also be utilized with a computer-based system to provide more complex database functions with the data.

One aspect of the present invention involves a self-contained, portable electronic information card system configured to receive data from an information card bearing computer readable data stored on a computer readable data storage media. The electronic information card system comprises a card reader configured to accept said information card and read said computer readable data and a controller coupled to the card reader to form the self-contained, portable electronic information card system. The controller is configured to receive the computer readable data from the card reader and to store the computer readable data.

Advantageously, the self-contained, portable electronic information card system also has a permanent memory coupled to the controller, and configured to receive the computer readable data from the controller for permanent storage. Additionally, the system has a display coupled to the main controller and configured to receive the computer readable data from the controller and display the computer readable data in visual text form on the display.

In one embodiment, the portable electronic information card system also has a user data interface such as a keyboard coupled to the controller and a communications interface coupled to the controller. In one embodiment the communications interface is to a separate computer system adapted to receive the computer readable data from the controller and store the computer readable data on a permanent storage media of the separate computer. Alternatively, the communications interface is to a communications line adapted to accept the computer readable data from the controller and to transfer the computer readable data to an independent data storage device. In one embodiment, the communications interface comprises a modem with a telephone line interface.

In one particular embodiment, information card comprises a business card and the computer readable data comprises data representing business information. In addition, the portable electronic information card system is specifically configured for use with a predetermined class of businessman, such as lawyers, doctors, education professionals, military personnel, government personnel, executives or any other class. In one embodiment where the information card comprises a business card, the keyboard has a sufficient number of keys to allow a user to manually enter business card information.

In one particular embodiment, the portable electronic information card system further has an audio responsive unit coupled to the controller. The audio responsive unit configured to receive audio information. Preferably, an audio information storage unit is coupled to the controller and to the audio responsive unit to receive and store the audio information.

Another aspect of the present invention involves an portable electronic business card system configured to receive data from a business card bearing computer readable data representing business card information. The electronic business card system comprises a card reader configured to accept the business card and read the computer readable data and a computer coupled to the card reader via an interface. The computer is configured to receive the computer readable data from the card reader and to permanently store the computer readable data on a permanent storage media for the computer. In one embodiment, the computer is a portable computer and the card reader is portable such that the electronic business card system is a portable system. In another embodiment, the computer comprises a desktop computer. Advantageously, the computer has a display configured to display the computer readable data in text form.

Another aspect of the present invention involves an electronic business card having first and second sides. A first side has computer readable storage media, wherein business card data is stored on the computer readable storage media. A second side has a printed text representation of the business card data for visual presentation.

Yet another aspect of the present invention involves a portable electronic business card system configured to receive data from a business card bearing computer readable data stored on computer readable storage media. The electronic business card system comprises a card reader configured to accept the business card and read the computer readable data coupled to a controller to form the portable electronic business card system. The controller is configured to receive the computer readable data from the card reader and to permanently store the computer readable data. Advantageously, the controller is responsive to an information organization module to store the business card information so that it is accessible based on one or more of a plurality of organizational parameters.

In one embodiment, the plurality of organizational parameters are selected from a group consisting of: a name, a business name, a specialty, an address, a telephone number, an area code, and a ZIP code.

In one embodiment, the electronic business card system has a user data interface such as a keyboard or a suitable substitute and a display, both coupled to the controller. The controller is then responsive to a data modification module to allow a user of the electronic business card system to modify the computer readable data with the keyboard or suitable substitute. The controller is further responsive to the data modification module to display the modifications made by the user.

In another embodiment, the electronic business card system has a telephone interface coupled to the controller. In this embodiment, the controller is responsive to an autodial and record transfer module to dial preselected telephone numbers utilizing the telephone interface. The telephone interface advantageously comprises a modem.

BRIEF DESCRIPTION OF THE DRAWINGS

FIG. 1 illustrates a general block diagram of the electronic business card system in accordance with the present invention.

FIGS. 3, 4, 5, 6, 6A, 6B, 7A, 7B, 8, 9, 9A, 9B and 10 depict exemplary flowcharts, which represent the functional operations of the electronic business card system.

DETAILED DESCRIPTION OF THE PREFERRED EMBODIMENTS

Figure 1A:
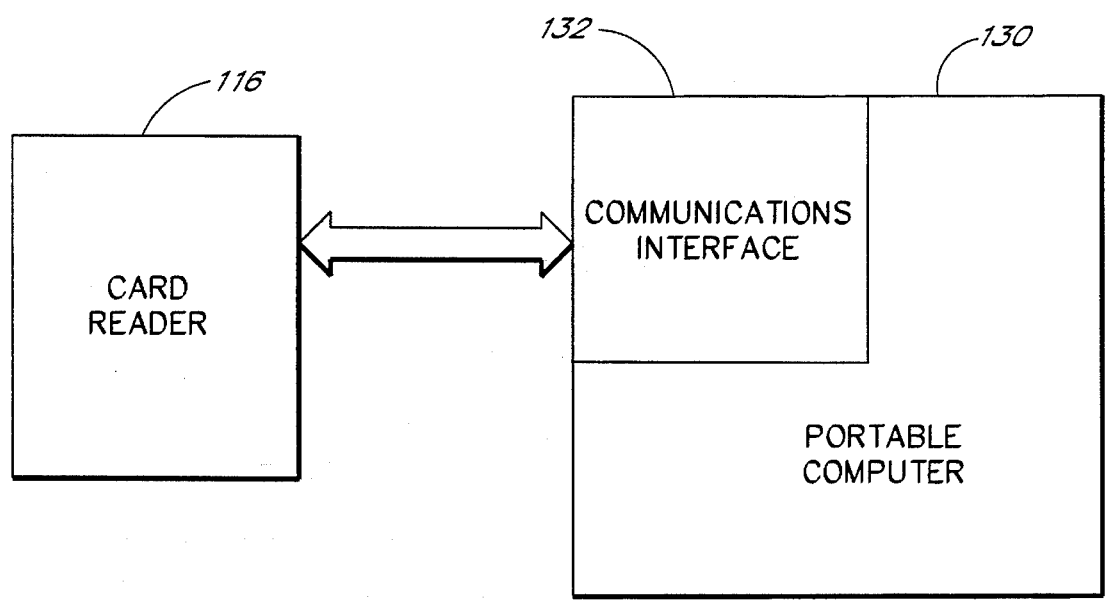
FIG. 1A illustrates an alternative embodiment of the electronic business card system in accordance with the present invention.

FIG. 1 depicts one embodiment of an electronic business card system 100 in accordance with the present invention. The electronic business card system 100 of the present invention is preferably totally portable and of a hand-held size. The exact size depends upon the features of a given particular unit. As depicted in FIG. 1, the electronic business card system 100 comprises a main controller 102, a system memory 104, a nonvolatile permanent storage memory 106, a system read-only memory 108, a display 110 with associated interface logic 112, a system clock 114, a conventional card reader 116, and a keyboard 118. The electronic business card system 100 further has a phone-in jack 120, a phone-out jack 122, and a printer-out connector 124. In addition, the system has a computer interface 126, which provides an interface to a computer system 128 such as a conventional personal computer or portable computer. In one embodiment, the electronic business card system 100 also has an audio responsive unit 129.

The main controller 102 preferably comprises an Intel 80×86-compatible microprocessor with supporting resources. Other controllers well understood in the art would also be appropriate. Similarly, the system clock 114 is a conventional computer-system clock 114, which provides continuous date and time information to the main controller 102.

In the present embodiment, the system read-only memory 108, the system memory 104, and the permanent storage memory 106 couple to the main controller 102 via a controller bus 103. The system read-only memory 108 stores the firmware and the application programs for operation of the electronic business card system 100. Preferably, corresponding applications program for operation of the electronic business card system 100 can be stored on the computer 128 such that the computer 128 can provide at least the same functionality as provided by the electronic card business system 100.

In the present embodiment, the system memory 104 comprises a one-megabyte, random-access memory, as well understood in the art. More or less memory could be utilized. As well understood in the art, the system memory 104 provides storage for run time operations.

The permanent storage memory 106 is used for nonvolatile data storage. In the present embodiment, the permanent storage memory 106 comprises 256 K-bytes of flash random-access memory (FRAM), as well understood in the art. As with the system memory 104, the permanent storage memory 106 could comprise more or less storage than described herein and could comprise a nonvolatile read/write memory of a different type than described above.

Preferably, the display 110 is configured to display at least two full business card entries at one time, depending upon the amount of information provided on the business card. The display 110 may also display other information, such as the owner's name, date, time, and other features as may be desired. In one embodiment, the display 110 comprises a 50-column by 8-row LCD or LED display, as well understood in the art; however, other display sizes are also feasible. Advantageously, the display 110 is a low power display because the display 110 can be one of the highest power consumption devices in the electronic business card system 100. The display 110 interfaces with the main controller 102 with its interface logic 112. The interface logic required between a microprocessor and a display is well understood in the art.

Preferably, the electronic business card system 100 operates on DC power. A DC rechargeable battery is used in the present embodiment. Preferably, the rechargeable battery is configured to be rechargeable in automobiles or other sources of 12-volt DC power and to be rechargeable using 120 VAC power with an appropriate converter, as well understood in the art. The electronic business card system 100 performs several functions as an independent unit without the use of the computer 128. These functions are described in further detail below.

Figure 2A:
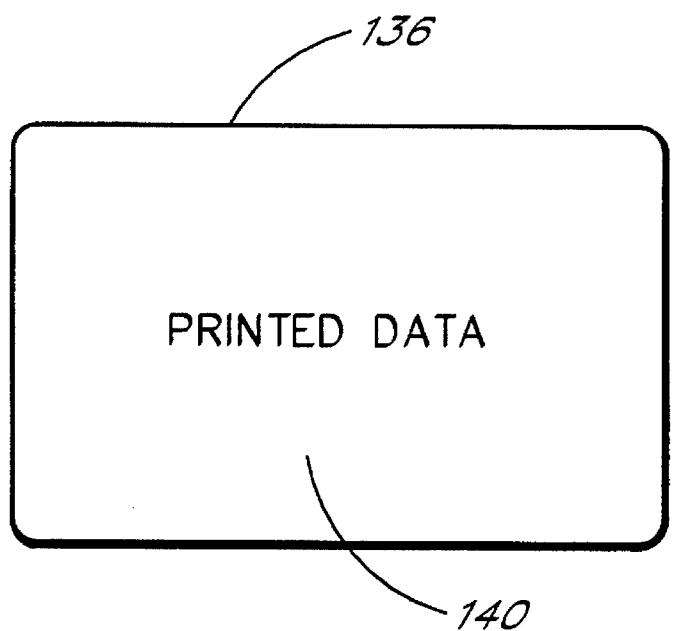
FIGS. 2A and 2B represent one possible embodiment of an electronic business card in accordance with the present invention.
Figure 2B:
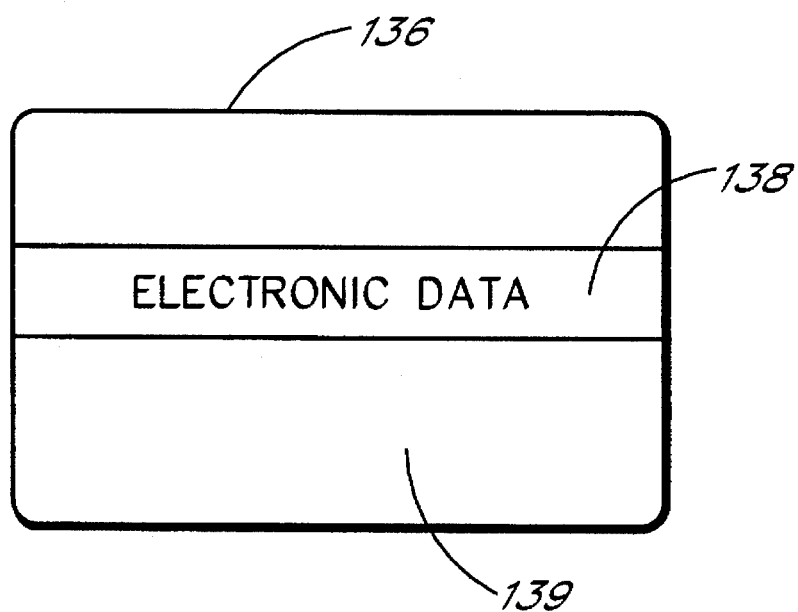

Preferably, the card reader 116 couples to the main controller 102 via a data bus 117. The main controller 102 issues commands to the card reader 116 and receives data from the card reader 116 via the data bus 117. Advantageously, the card reader 116 comprises a conventional card reader such as a magnetic-stripe reader as well understood in the art. Similar card readers are utilized in the credit card and identification card industries. Such readers can be configured to read one or more stripes of magnetic data, as well understood in the art. Preferably, the electronic business card reader 116 is configured to read electronic business cards 136 (FIGS. 2A and 2B) swiped in either direction through the card reader 116, in the embodiment using a magnetic stripe card reader. Other types of card readers are also envisioned such as optical, memory cards and others.

The keyboard 118 couples to the main controller 102 via the data bus 117 and provides a user input interface which allows the user to make selections and enter data as desired. Preferably, the keyboard 118 is quite small, similar in size to that of electronic daily planners or programmable calculators, to allow the electronic business card system 100 to maintain its portable size. In one embodiment, the keyboard 118 has 26 keys, each key providing one or more functions. In a further embodiment, the electronic business card system 100 is configured without the keyboard 118. In such an embodiment, the display 110 could be a touch screen which allows entry of certain functions. Other data entry devices, such as a light pen, track-ball, or the like could also be used. Functions which require a data entry device such as a keyboard 118 would not be available in embodiments not having a keyboard 118 or suitable substitute, unless the electronic business card system 100 is coupled to the computer 128.

It should be understood that the configuration shown for the electronic business card system 100 is exemplary. Other embodiments are envisioned. For instance, the card reader 116 could be coupled directly to a portable personal computer 130 via a communications interface 132, as depicted in FIG. 1A. In such an embodiment, the portable computer 130 provides the supporting devices for the card reader 116. For instance, the personal computer disk drives could be utilized for permanent storage and the portable computer memory could provide the function of the system memory 104. Furthermore, the portable computer 130 could have a modem and phone-out jacks, a printer interface, a display and a system clock, as well understood in the art. The portable computer 130 would also have a keyboard. The interface 132 comprises a standard serial or parallel interface, as well understood in the art. Similarly, the portable computer 130 could comprise a personal digital assistant, and the card reader 116 could be coupled to the personal digital assistant via a standard PCMCIA interface, as well understood in the art. In addition, the electronic business card system may comprise a desktop computer with the card reader 116. Accordingly, other embodiments of the electronic business card system 100 are contemplated in the present invention.

As well understood in the art, the phone-in jack 120 and phone-out jack 122 couple to a phone line interface (not shown) comprising an associated modem for purposes of data transmission over the phone lines. Similarly, the printer-out connector 124 couples to the main controller 102 via a printer interface (not shown), as well understood in the art. Additional communications interfaces are also envisioned such as radio and other wireless interfaces.

FIG. 2 depicts an exemplary electronic business card 136. As depicted, the electronic business card 136 is a standard credit-card or business-card sized card (made of plastic, cardboard, paper or the like). Preferably, a back side 139 of the electronic business card 136 has at least one data storage media 138. For example, one type of data storage media is a conventional magnetic stripe, as well understood in the art. However, other data storage media are also known, such as optics, memories, and others.

The data storage media 138 on the electronic business card 136 is encoded with computer-readable business card data, such as the full first and last name, a title or heading (e.g., Dr., Mr., Mrs., President, V.P., etc.), a company name, a company address, the city, the state, the ZIP code, a phone number, a fax number, and an Electronic Mail address. Other information can be provided to suit particular applications. For example, if the system is configured for doctors, the data may include a license number, a specialty, and a language spoken. Other particular applications are envisioned such as dentists, lawyers, government agencies, educational uses, and military uses. In one embodiment the electronic business card 136 has the information printed on a front side 140 of the card 136 with the data storage media 138 on the back side 139 of the card 136. In an embodiment using conventional magnetic stripes, the electronic business card 136 has multiple magnetic stripes. In the present embodiment, the electronic business card 129 has one, two or three magnetic data storage stripes (each stripe having potentially a plurality of tracks). Preferably, the data storage media is readily re-encodable to change the business card information as desired.

In the present embodiment, the system read-only memory 108, the system memory 104, and the permanent storage memory 106 all provide specific functions for the operation of the electronic business card system 100. Preferably, the system read-only memory 108 contains the firmware and applications programs which are utilized by the main controller 102 for operation and control of the electronic business card system 100. The system memory 104 preferably comprises random access memory as described above. Accordingly, the system memory 104 provides operational memory during execution of the firmware and applications programs of the electronic business card system 100. In the present embodiment, the random access memory is used to store basically any data which is utilized on a temporary basis. Use of random access memory in control systems is well understood in the art. Data which is to be maintained permanently, or semi-permanently, is transferred to the permanent storage memory 106. As well understood in the art, the transfer of data to the permanent storage memory generally takes place at power-off, and not during runtime. Similarly, as well known in the art, the data in the permanent storage memory 106 is transferred to system memory at start-up. The permanent storage memory 106 has read and write functions, but maintains the data stored without the continual application of power. Other types of permanent storage memory 106 which require the continual application of power via a battery are also well understood in the art. However, preferably, the permanent storage memory 106 is of the non-volatile type and does not require continual application of power. The uses and operation of the electronic business card system 100 will be apparent with the below discussion of the functions with reference to the exemplary flowcharts.

FIGS. 3–9 depict exemplary flowcharts representing the functions of the electronic business card system 100 of the present invention. In general, the flowcharts depict the operation of receiving and storing data from electronic business cards 136 and manipulating the data in various ways, as further described below. Generally, the electronic business card system 100 of the present invention operates is one of several modes, each mode providing separate functions to the user which relate to the accepting, storing, accessing, and manipulating the business card data. Preferably, a record is formed for each business card, and the records are stored in categories. Each record is accessed with reference to the category or one or more of a plurality of fields that makes up each record. A more detailed discussion follows.

Figure 3:
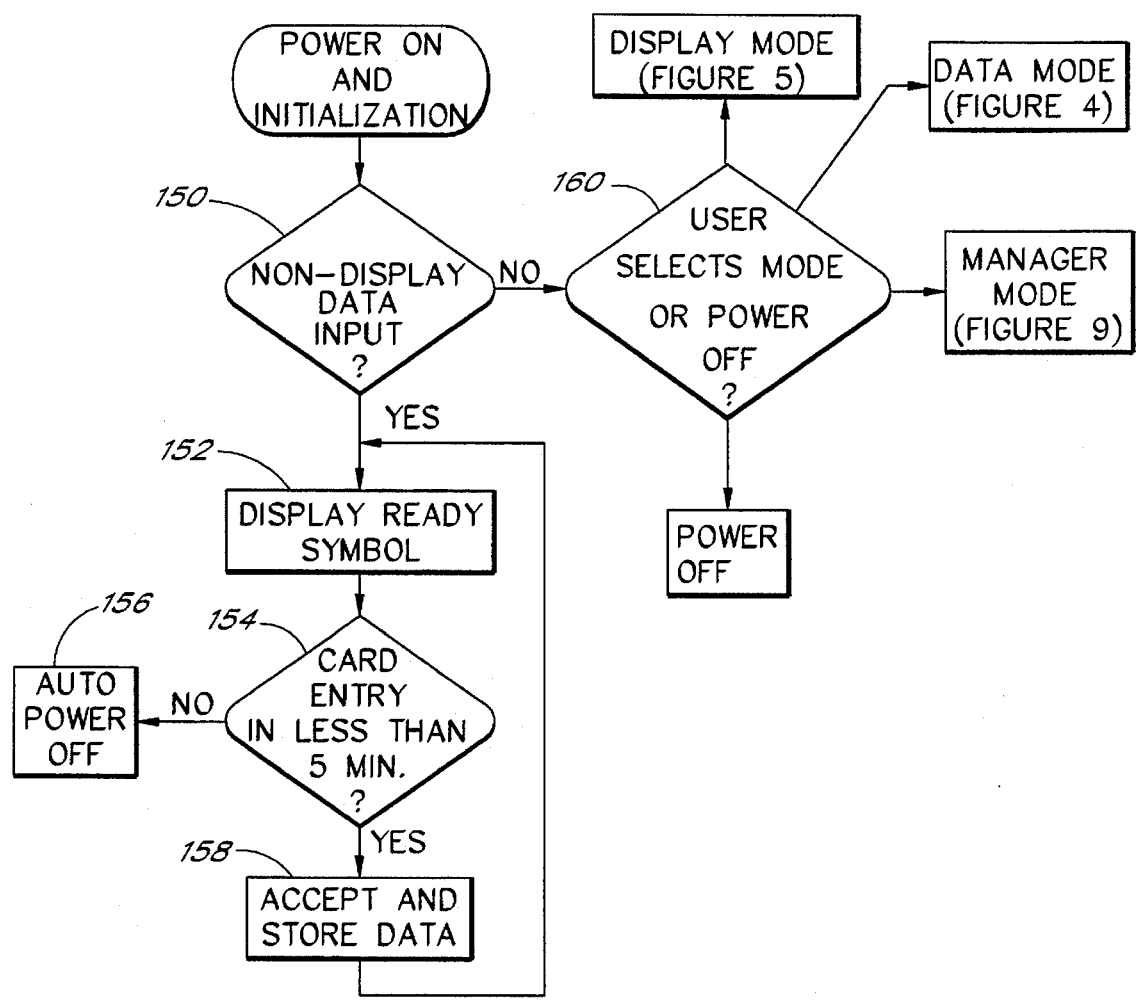

FIG. 3 illustrates the general power-on sequence and a data input sequence that operates without displaying the data entered. When the card reader 116 is powered on, the card reader 116 executes power-on initialization and self-test functions conventional for microprocessor-based control systems. The user then determines whether to utilize non-display data input or whether to select a mode which involves data display during data input or data manipulation, as represented in a decision block 150. The user may desire to select nondisplay data input in order to conserve power with the electronic business card system 100. In nondisplay data input mode, the electronic business card system 100 can accept data from electronic business cards 136 without the display 110 being active. This conserves battery power.

If the user selects nondisplay data input, the card reader 116 displays a ready symbol, as represented in an activity block 152. The ready symbol preferably comprises a small LED or the like, which indicates that the electronic business card system 100 is ready to accept data. Other indicators are well understood in the art. The card reader 116 then monitors for an electronic business card 136 entry as represented in a decision block 154. For instance, in the present embodiment, which utilizes a magnetic swipe card reader, the card reader 116 monitors for the swipe of a business card with an appropriately encoded magnetic stripe. Similarly, if the card reader 116 is an optical reader, the electronic business card system 100 monitors for a business card appropriately encoded with an optical memory. As explained above, the magnetic stripe is preferred in that it is easily encoded and inexpensive.

In the present embodiment, the electronic business card system 100 automatically powers-down if it does not receive data within five minutes, as represented in the decision block 154 and an activity block 156. Whenever the electronic business card system 100 powers-down automatically, the system becomes active automatically with the entry of an electronic business card 136. For instance, if the electronic business card system 100 has powered down, the swipe of a business card with a magnetic stripe activates the system and the system reads the data from the business card. Preferably, when the electronic business card system 100 is activated from power down mode by the entry of the business card, the electronic business card system 100 enters the nondisplay 110 data input sequence described with reference to FIG. 3. In other words, the display 110 does not need to be activated in order to accept the data.

If the electronic business card system 100 detects an entry (whether from power-down or from active mode), the card reader 116 accepts the data from the electronic business card 136 (e.g., from the magnetic stripe or stripes in the present embodiment), checks parity, and stores the data in the permanent storage memory 106 if the data is not corrupted, as represented in activity block 158. If data was not received error free, the electronic business card system 100 provides the user with an appropriate indicator (e.g., a data error LED or the like). When an entry, also known as a record, is stored, the entry typically has a number of fields, such as those described above (e.g., the first name, last name, title, company name, company address, city, state, ZIP, phone number, fax number, Email address, area code, etc.). Preferably, the date, time and a sequence number are also recorded with each entry. When the electronic business card system 100 has stored the entered data in the permanent storage memory 106, the system then displays the ready symbol once again (action block 152) and waits for an entry in less than five minutes (decision block 154). The sequence repeats itself until five minutes pass without an entry. It should be understood that the five-minute interval of inactivity until the electronic business card system 100 automatically powers down may vary from the five minutes described above. In one embodiment the period of inactivity is selectable by the user.

If the user does not select nondisplay data input (decision block 150), the electronic business card system 100 presents a MAIN MENU which allows the user to select operation in a DATA MODE, a DISPLAY MODE, or a MANAGER MODE, or to select to power-down the system, as represented in a decision block 160. If the user elects to turn off the power of the electronic business card system 100, the system powers down and waits to be activated by the user. It should be understood, that whenever the electronic business card system powers on, any data from the permanent storage memory 106 is transferred to the system memory 104 for run time operations. Likewise, when the electronic business card system powers down, any data which is to be maintained permanently (permanent denoting storage after power has been removed) is transferred from the system memory back to the permanent storage memory. As well understood in the art, this operation is carried out using memory mapping techniques where the data from the permanent storage memory 106 is maintained in the system memory 104 during run time operations.

Figure 4:
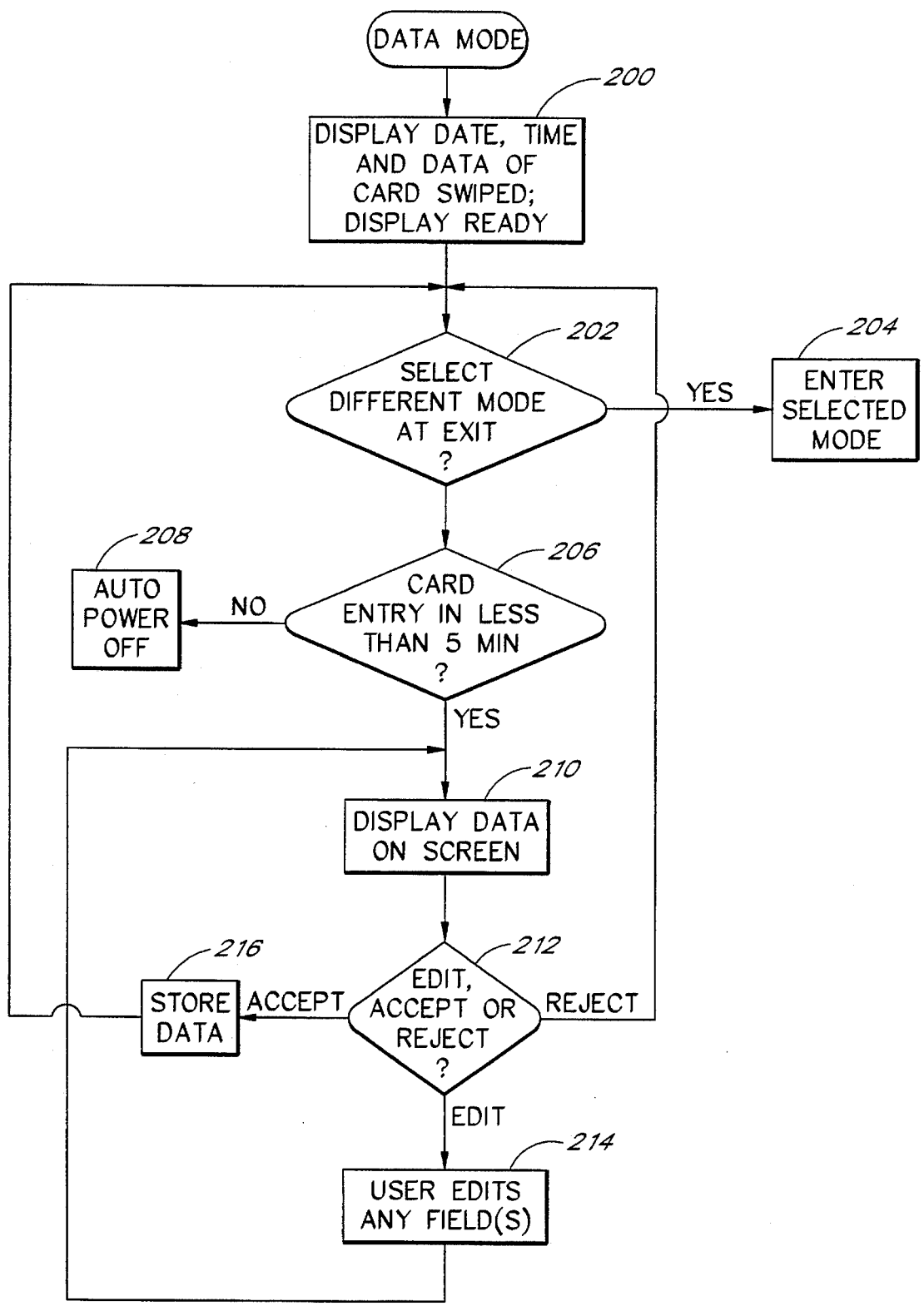

The operations of the DATA MODE are illustrated in FIG. 4. As represented in an activity block 200 of FIG. 4, when the electronic business card system 100 enters DATA MODE, the first and last name from the business card last entered are displayed on the display 110 with the accompanying date and time that the last entry was made. The electronic business card system 100 also displays the ready symbol, indicating that the card reader 116 is ready to accept a card entry. At this point, the user can also select a different mode of operation or exit data entry altogether, as represented in a decision block 202. If the user desires to select a different mode, the user makes that selection, as represented in an activity block 204. In the meantime, the card reader 116 waits for a card entry in less than five minutes, as represented in a decision block 206. As explained above, the electronic business card system 100 will power-down after five minutes of inactivity to conserve battery power, as represented in an activity block 208. As explained above, when the business card system powers down automatically, the system automatically becomes active and accepts the business card data when a card entry is received via the card reader 116.

In DATA MODE, each time a card entry is made with less than five minutes between entries, the data from the business card is displayed on the display 110, as represented in activity block 210. Preferably, the electronic business card system 100 also allows the user to edit each entry, accept the entry, or reject the entry, as represented in a decision block 212. If the user chooses to edit the entry, as represented in an activity block 214, the user uses the keyboard 118 to edit any fields or make additional notes to be stored with the business card data. Preferably, the system also provides for selecting different categories for storage of the business card information. For instance, the business card information could be stored in a category for vendors, for customers, for clients, etc.

In one embodiment, the electronic business card system 100 also has the audio responsive unit 129. The audio responsive unit 129 preferably comprises an audio input and output system that allows the user to record audio notes to be stored with any entry. This audio storage system advantageously comprises a digital audio storage and retrieval system, as well known in the art. In other words, the audio responsive unit comprises a microphone, an analog-to-digital converter, a digital-to-analog converter and a speaker, to allow for the recording and playback of audio signals. In an alternative embodiment, the audio responsive unit comprises an analog audio input/output system utilizing a single-chip voice record/playback device such as the Information Storage Device, Inc., ISD 1012A.

If the user chooses to reject the data from the last card entry (decision block 212), the data from the entry is not stored, and the electronic business card system 100 waits for further input. If the user chooses to accept the data in its present form (either before or after editing), the data is stored in the portion of the system memory mapped for the permanent storage memory 106 (along with the date, time and sequence number of the entry), as represented in an activity block 216. The data will be transferred to the permanent storage memory 106 of power-off.

Figure 5:
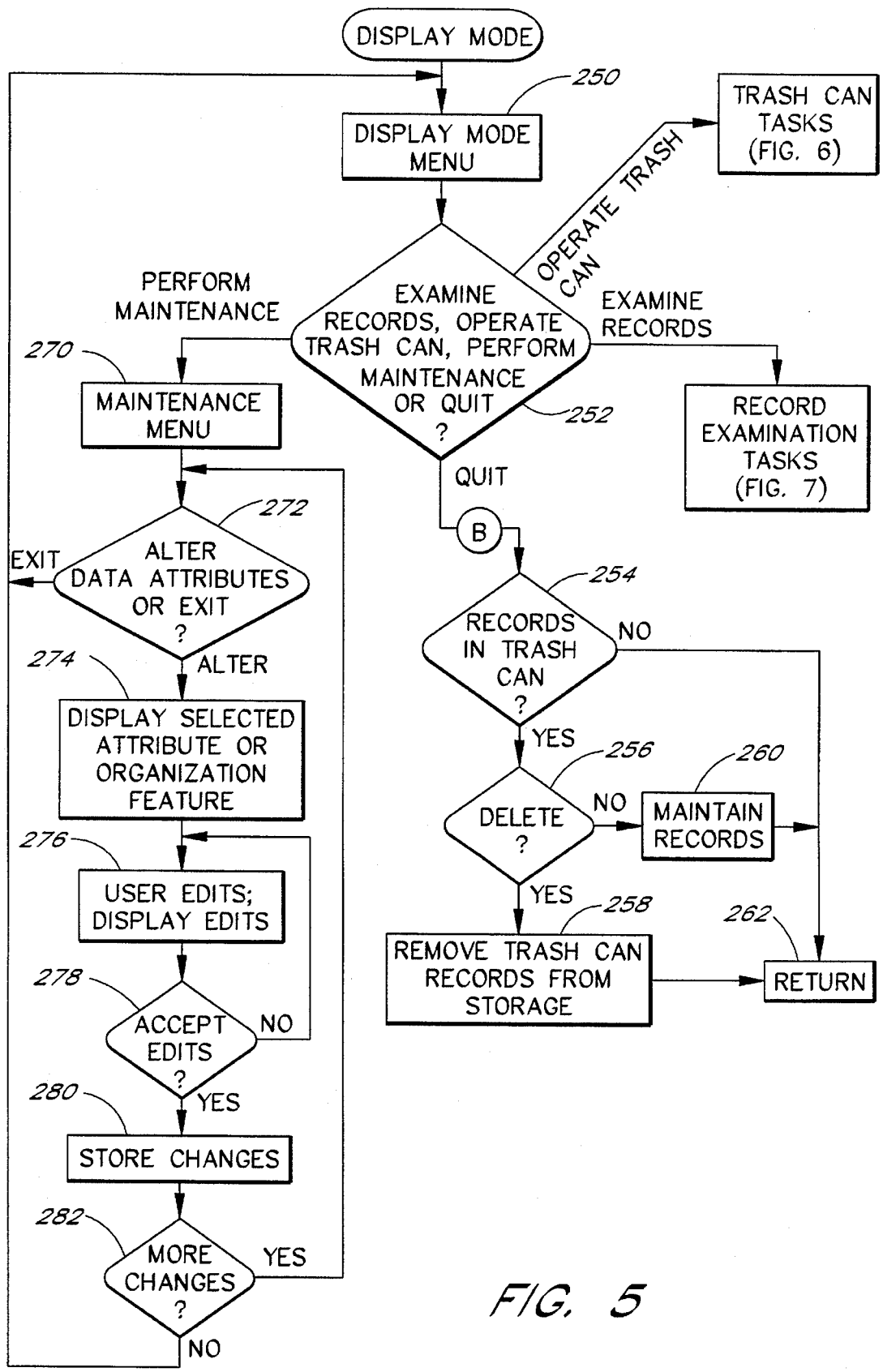

FIG. 5 is an exemplary flowchart that illustrates the general functions of DISPLAY MODE operation for the electronic business card system 100. In general, in the DISPLAY MODE, the electronic business card system 100 displays any record (entry) through reference to its sequence number, to its name field, to its category field, to its area code field, or to other fields. In DISPLAY MODE, the user also requests sort operations, such as an alphabetical sort for all records in any category, a date sort for all records entered during a specified time period, an area code sort, and many other sort operations. Wherever applicable, an alphabetical sort is performed within any subgroup. The electronic business card system 100 also provides for several functions in relation to the sort operations. For instance, the reader can delete any record or group of records listed in a sort operation; the reader can provide a list with the name only of records found in a sort (when coupled to a printer); the reader can print records found in a sort; and the electronic business card system 100 can play back audio or text notes associated with particular records or a group of records from a sort.

As represented in FIG. 5, when the electronic business card system 100 enters DISPLAY MODE, the DISPLAY MODE MENU is presented on the display 110, as represented in an activity block 250. The DISPLAY MODE MENU allows the user to select record examination tasks, trash-can tasks, (delete records) maintenance tasks, or quit.

If the user elects to operate trash can tasks (decision block 252), the electronic business card system 100 provides a TRASH CAN MENU with several options. The trash can tasks are further discussed in relation to FIG. 6.

If the user elects to perform examine records tasks, the electronic business card system 100 displays the RECORD EXAMINATION MENU. The functions of the examine records tasks are discussed in further detail below with reference to FIG. 7.

If the user elects to quit, the electronic business card system 100 determines if records are present in a "TRASH CAN," as represented in a decision block 254. If no records are present in the TRASH CAN, the electronic business card system 100 returns to the MAIN MENU where the user selects between DATA MODE, MANAGER MODE, DISPLAY MODE, or power off, as represented in FIG. 1 (decision block 160).

If the electronic business card system 100 determines that records are present in the TRASH CAN (decision block 254), the electronic business card system 100 queries the user whether the records in the TRASH CAN are to be deleted, as represented in a decision block 256. If the user elects to delete the records in the TRASH CAN, the electronic business card system 100 removes the TRASH CAN records from the system memory 104, as represented in an activity block 258. The records are then deleted from the permanent storage memory 106 at power down when the records are transferred to the permanent storage memory 106. If the user elects to not delete the records in the TRASH CAN, the card system maintains the records in a TRASH CAN file as represented in an activity block 260. The records in the permanent TRASH CAN file remain in the TRASH CAN until the user elects to delete them. It will be understood that in one embodiment the TRASH CAN comprises a list of records that have been selected for deletion. The records are still maintained in permanent storage until the user elects to delete these records. After either removal of the TRASH CAN records from storage or maintaining the records, the electronic business card system 100 returns (activity block 262) to the MAIN MENU where the user selects between the DATA MODE, the MANAGER MODE, the DISPLAY MODE, or power off, as depicted in FIG. 1 (decision block 160).

If the user elects to perform maintenance tasks (decision block 252), the electronic business card system 100 displays a MAINTENANCE MENU, as represented in an activity block 270. The MAINTENANCE MENU provides the user with the option to alter data attributes or to exit, as represented in a decision block 272. If the user elects to exit, the electronic business card system 100 again displays the DISPLAY MODE MENU (activity block 250).

The MAINTENANCE MENU provides several data attribute alteration selections. The user can select to alter the date and time for the electronic business card system 100, alter the category names for records in the electronic business card system 100, or alter the current signature for the electronic business card system 100. The category names are simply the names given to categories of records in the electronic business card systems 100 such as customers, clients, and any other category desired by the user. The alteration of the date and time for the electronic business card system 100 allows the user to alter the internal clock of the electronic business card system 100 to correct for changes, such as daylight savings time. Finally, the current signature change allows the user to alter the signature for the electronic business card system 100.

The signature is essentially an indicator of the owner of the electronic business card system 100. For instance, the signature may be the name and phone number of the owner of the electronic business card system 100. This is advantageous in the event that the electronic business card system 100 owner misplaces or loses the electronic business card system 100, and it is found by someone else. The finder of the electronic business card system 100 can access the signature to determine the owner of the electronic business card system 100. However, the access to the data in the electronic business card system 100 is preferably protected through a password connected with the signature. In other words, the signature can be viewed simply by turning on the electronic business card system 100; but the data within the electronic business card system 100, other than the signature, is inaccessible without a password if the password option is selected.

For each of the attributes that are selectable from the MAINTENANCE MENU by the user for alteration, the basic functions are the same. First, the electronic business card system 100 displays the selected attribute, as represented in an activity block 274. For instance, if the user elects to modify category names, the electronic business card system 100 displays the currently defined category names. Similarly, if the user elects to modify the date and time, the electronic business card system 100 first displays the current date and time maintained by the electronic business card 100 system. Finally, if the user elects to modify the signature for the electronic business card system 100, the system first displays the currently defined signature or displays no signature if no signature is defined. Next, the business card system allows the user to edit the selected attribute or organization feature and concurrently displays the edits on the display 110, as represented in an activity block 276.

During editing, the electronic business card system 100 allows the user to indicate when to accept the edits, as represented in a decision block 278. The electronic business card system 100 allows the user to continue edits until the user chooses to accept the edits (decision block 278). Once the user accepts the edits, the electronic business card system 100 stores the selected attribute or organization change in the system memory 104, as represented in an activity block 280. The electronic business card system 100 then queries the user whether more changes are desired to data attributes or organization features, as represented in a decision block 282. If the user elects not to make more changes, the DISPLAY MODE MENU is again displayed on the display 110 (activity block 250). If the user desires to select more changes, the user is again prompted with the attribute selected, and the editing process repeats.

As explained above, FIG. 6 illustrates the trash can tasks performed by the electronic business card system 100. If the user elects to operate the TRASH CAN from the DISPLAY MODE MENU (or elsewhere), the electronic business card system 100 displays the TRASH CAN MENU, as represented in an activity block 290 of FIG. 6. The TRASH CAN MENU provides the user with the option to "empty" the TRASH CAN, to manipulate the TRASH CAN, or to exit, as represented in a decision block 292.

If the user elects to exit, the electronic business card system 100 exits the trash can tasks (activity block 294) without modifying or removing the records in the TRASH CAN. Upon exit, the DISPLAY MODE MENU is again presented (activity block 250 of FIG. 5). If the user elects to empty the TRASH CAN (decision block 292), the electronic business card system 100 first confirms with the user that the user desires to delete all records from the TRASH CAN, as represented in a decision block 296. If the user does not confirm that all records in the TRASH CAN list are to be deleted, the electronic business card system 100 again displays the TRASH CAN MENU (activity block 290). If the user confirms the deletion of all records from the TRASH CAN, the electronic business card system 100 removes all TRASH CAN records from the portion of the system memory mapped for the permanent storage memory 106, as represented in an activity block 298. The electronic business card system 100 then provides an indication to the user that the TRASH CAN is empty by displaying an appropriate message on the display 110, as represented in an activity block 300. After the TRASH CAN records are removed and the appropriate indication is provided, the electronic business card system 100 returns (activity block 294) and displays the DISPLAY MODE MENU (activity block 250, FIG. 5).

In an alternative embodiment, after the indication that the TRASH CAN is empty has been provided (activity block 300), the electronic business card system 100 provides an undo option. In such an embodiment, the electronic business card system 100 maintains an undo file, which contains all records marked for the TRASH CAN in nonpermanent storage (i.e., the system memory 104). The undo option allows the user to recover the records removed from the TRASH CAN, until the electronic business card system 100 is powered down.

Figure 6B:
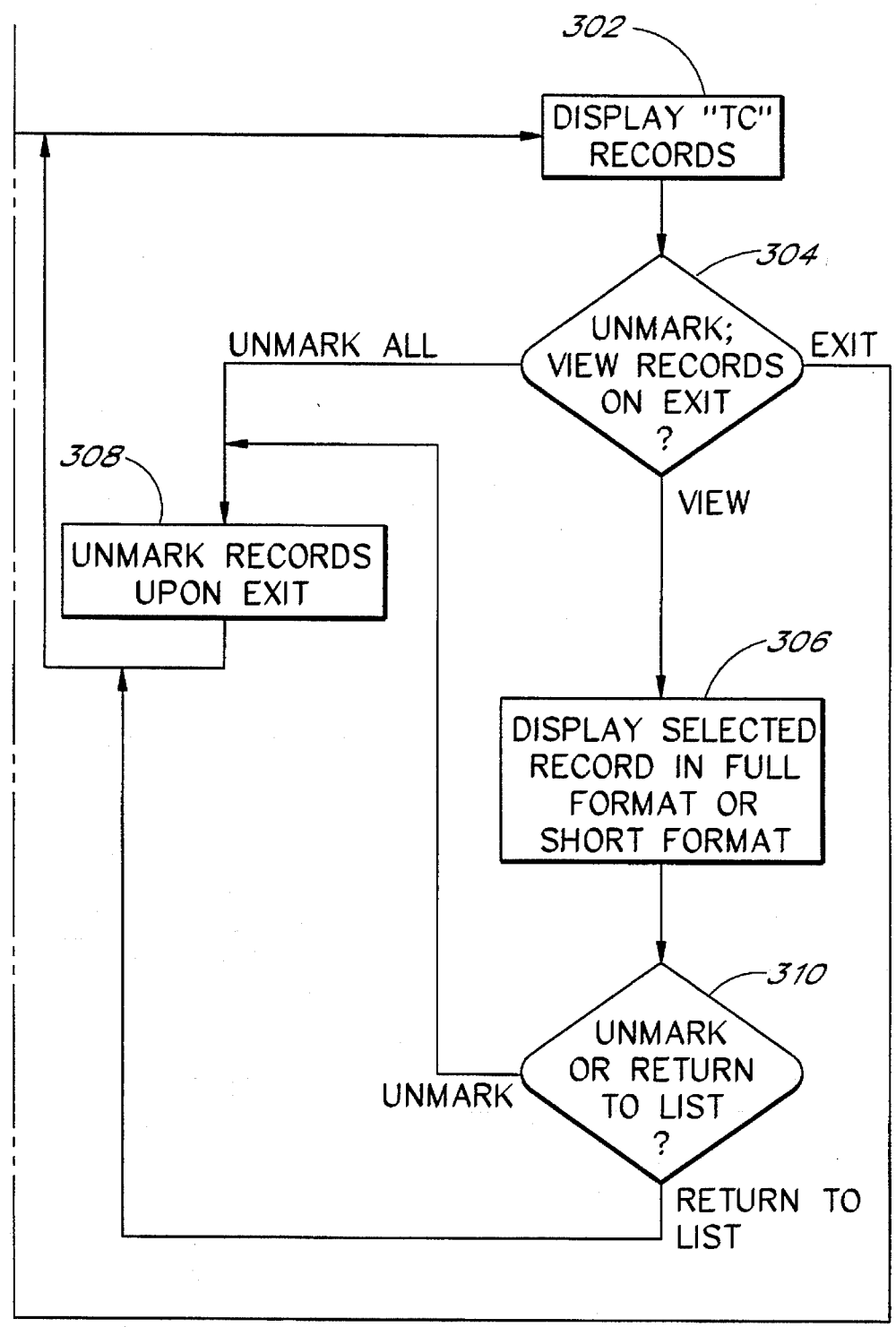

If the user elects from the TRASH CAN MENU to manipulate the records on the TRASH CAN list (decision block 292), the electronic business card system 100 displays a short-form or long-form list (as selected by the user) of all records marked as TRASH CAN records, as represented in an activity block 302 of FIG. 6B. The electronic business card system 100 then provides the user with the option to unmark all records marked as TRASH CAN records, to view and manipulate individual records, or to exit, as represented in the decision block 304. If the user elects to exit, the electronic business card system 100 again returns to the DISPLAY MODE MENU, as represented in the activity block 294. If the user elects to unmark all records marked as TRASH CAN records, the electronic business card system 100 removes all TRASH CAN marks (record markers indicating a record is a designated record for the TRASH CAN) and maintains those records in permanent storage, as represented in an activity block 308. If the user elects to view individual records (decision block 304), the electronic business card system 100 displays each record in sequence, as represented in the activity block 306, and provides the user with the option to unmark each individual record, as represented in a decision block 310. Alternatively, the user can return (decision block 310) to the display of the TRASH CAN list (activity block 302). If the user elects to unmark one or more of the records marked for the TRASH CAN, the electronic business card system 100 unmarks the selected records, as represented in the activity block 308. Accordingly, these records (which have been unmarked) are not deleted.

Figure 7A:
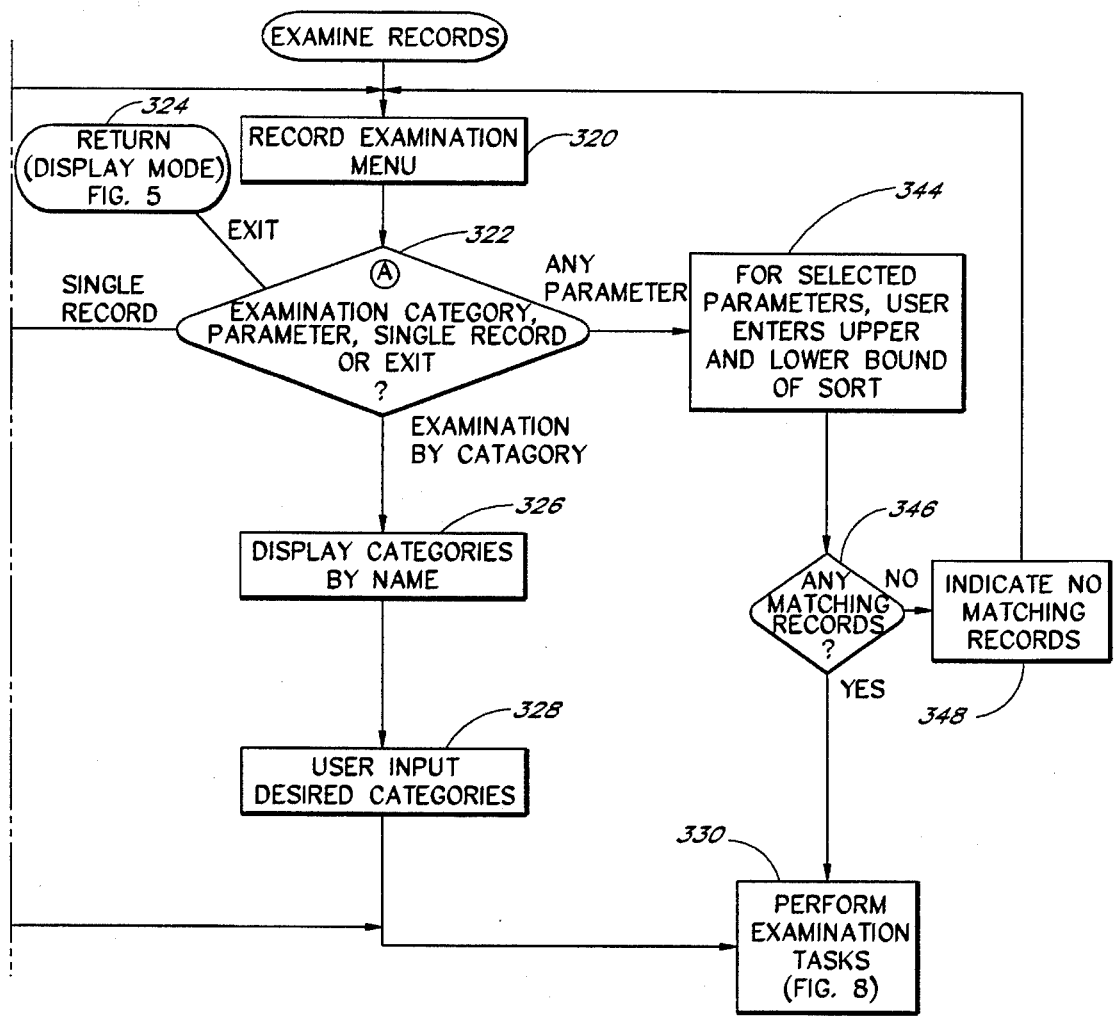
Figure 7:
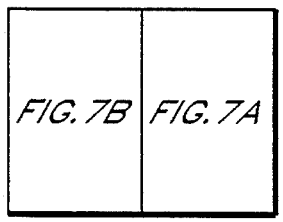
Figure 8:
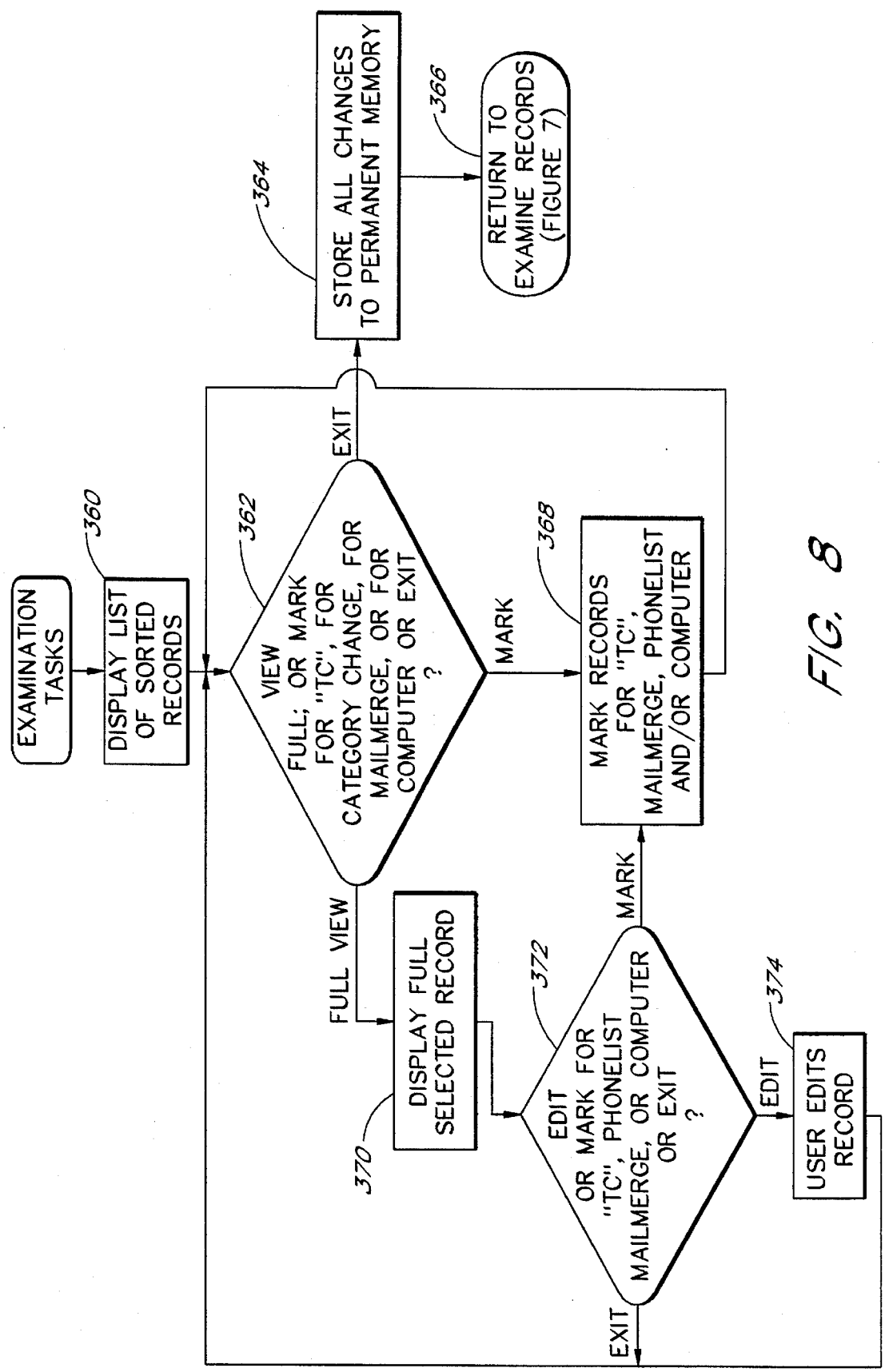

If from the DISPLAY MODE MENU (FIG. 5) the user elects to perform record examination tasks, the electronic business card system 100 displays the RECORD EXAMINATION MENU, as represented in an activity block 320 of FIG. 7A. In general, the RECORD EXAMINATION MENU allows the user to search the records and manipulate the data base in various ways and perform several additional tasks, as represented in FIGS. 7 and 8.

The RECORD EXAMINATION MENU initially provides the user with the choice of examining records by category, by a particular parameter common to records, or by single records. The user can also elect to exit from the RECORD EXAMINATION MENU. These options are represented in a decision block 322 of FIG. 7A. If the user elects to exit, the electronic business card system 100 returns, as represented in an activity block 324, and again displays the DISPLAY MODE MENU (activity block 250, FIG. 5). If the user elects to examine records by category, the electronic business card system 100 displays the currently defined categories by name, as represented in an activity block 326. As explained above, the categories are user-defined categories and/or predefined categories such as vendors and clients. The user then selects the category or categories of records desired, as represented in an activity block 328. In other words, the examination by category option allows the user to select from the currently defined categories to perform a search by category or a group of categories. The electronic business card system 100 then performs examination tasks selected by the user, as represented in an activity block 330. The examination tasks are further described with reference to FIG. 8 below.

Figure 7B:
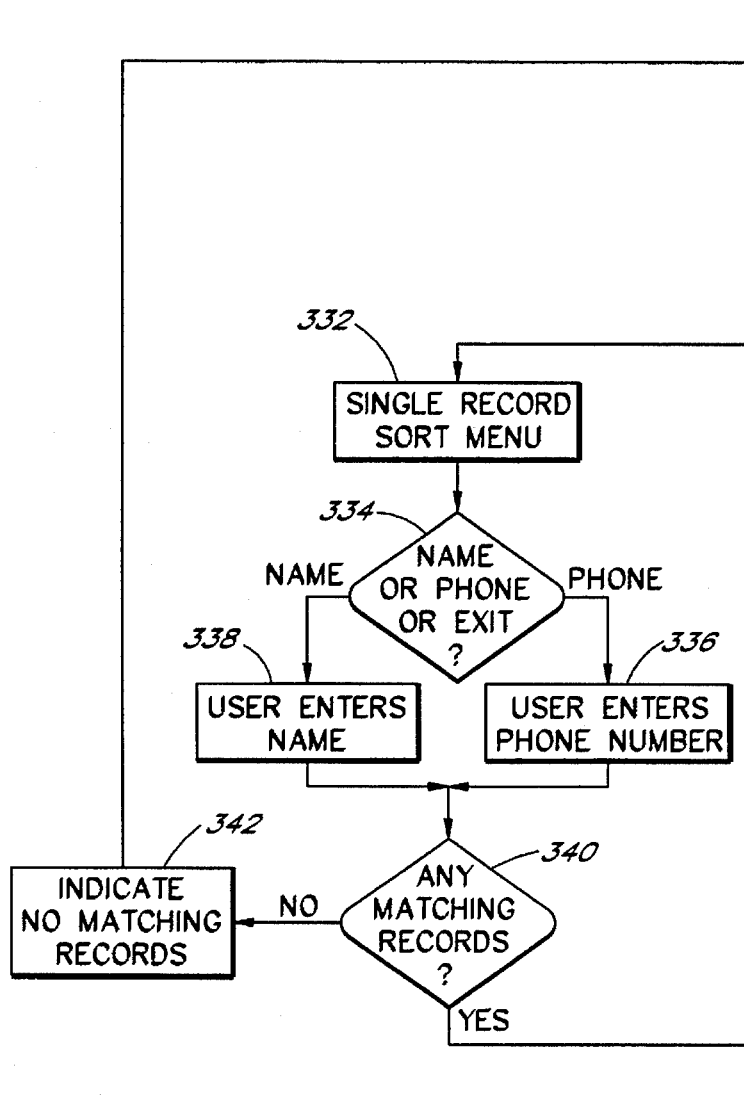

If the user elects to examine a single record (decision block 322), the card system displays the SINGLE RECORD SORT MENU, as represented in an activity block 332 of FIG. 7B. In the SINGLE RECORD SORT MENU, the user is provided the opportunity to search for users by name or phone number, as represented in a decision block 334. It should be understood that additional search parameters could also be utilized for the SINGLE RECORD SORT MENU. If the user elects to sort by phone number, the user enters the phone number desired (and possibly the area code), as represented in an activity block 336. Alternatively, if the user elects to search for single records by name, the user enters the name desired, as represented in an activity block 338. In either case, the electronic business card system 100 then searches for matching records, referencing the entered name or phone number, as represented in a decision block 340. If the electronic business card system 100 does not find any records with matching name or phone number entries, as the case may be, the electronic business card system 100 indicates on the display 110 that no matching records were found, as represented in an activity block 342 and then returns to the RECORD EXAMINATION MENU (activity block 320, FIG. 7A). If the card system locates matching records, the card system continues to perform examination tasks, as represented in the activity block 330 and further explained with reference to FIG. 8.

If from the RECORD EXAMINATION MENU (activity block 320) the user elects to sort by parameter, the user enters the upper and lower bounds of the selected examination parameter. In the present embodiment, the categories comprise the fields defined for each record (e.g., company name, area code, ZIP code, date of data record entry, name, and phone number). The input of the upper and lower bounds of the sort is represented in an activity block 344 (FIG. 7A). The electronic business card system 100 then determines whether any records fall within the upper and lower bounds of the sort for the selected parameter, as represented in a decision block 346. If the electronic business card system 100 does not locate any records that fall within the upper and lower bounds of the sort, the electronic business card system 100 indicates that no matching records were found, as represented in an activity block 348, and then displays the RECORD EXAMINATION MENU. If the electronic business card system 100 locates records that fall within the upper and lower bounds of the sort, the electronic business card system 100 proceeds to perform examination tasks, as represented in the activity block 330, as further discussed below with reference to FIG. 8.

FIG. 8 depicts, in general, the examination tasks that are available once records are located in a single-record search, a category-of-records search, or a sort-by-parameter search. Once records have been located, the electronic business card system 100 displays a summary list of the records selected or found, as represented in an activity block 360 of FIG. 8. In addition, the user may view the records in full form, mark records for the TRASH CAN, mark records for a category change, mark records for mail-merge lists, mark records for a phone list, or mark records for transfer to the computer 128, as represented in a decision block 362. Alternatively, the user can elect to exit with or without saving the changes. If the user elects to exit the examination tasks, the electronic business card system 100 stores all changes that have been made to the portion of the system memory 104 mapped for the permanent storage memory 106 (activity block 364), and returns to the RECORDS EXAMINATION MENU, as represented in the return block 366. The changes will be made to the permanent storage memory 106 upon power down.

If the user elects to mark records from the summary list (decision block 362), the user then marks records for the TRASH CAN, for a category change, for a mail merge, for the phone list, and/or for transfer to the computer 128, as represented in an activity block 368. The user may mark each record for none, one, or more than one of the above described items. In each case, the electronic business card system 100 allows records to be unmarked. The marks for any one or more of the actions are displayed with the corresponding marked record(s).

If the user elects to view records in full form (decision block 362), the electronic business card system 100 displays the full form of the selected record, as represented in an activity block 370. In other words, the electronic business card system 100 displays all fields for the associated record. The user is then given the option to edit the displayed record, mark the record for the TRASH CAN, mark the record for inclusion on the phone list, mark the record for inclusion in a mail-merge list, mark the record for transfer to the computer 128, or exit, as represented in a decision block 372. If the user elects to edit a record, the electronic business card system 100 allows the user to make entries and deletions and generally to edit the fields of the particular selected record, as represented in the activity block 374. The updated record is displayed as edited. Once the user indicates that editing is finished, the user is again provided the option to view full records, mark records, or exit, as represented in the decision block 362 and as described above. If a record that is displayed in full is selected by the user for marking, the user then marks the record as explained above (for a group of records), and the marks are displayed and can be changed, as represented in the activity block 368. Additional examination tasks for more flexibility can also be provided such as a user programmable search field.

As explained above, the MAIN MENU (decision block 160, FIG. 3) also provides the user with the option to execute operations in the MANAGER MODE. In the MANAGER MODE, the general functions of the electronic business card reader 116 are to provide for mail merge of records marked for mail merge, to perform auto dialing based upon any category of records, and to down-load records marked for transfer to the computer 128.

In general, the mail merge operation allows the user to merge all or subsets of records marked for mail merge into business letters entered directly into the electronic business card system 100 (if the particular business card system model provides this capability) or downloaded to or from the computer 128. These business letters with the information merged from the electronic business card system 100 can be printed directly from electronic business card system 100. Alternatively, the mail merge operation can be executed in conjunction with the computer 128, with the business card information from the electronic business card system 100 being forwarded to the computer 128. The computer 128 then merges the information into a letter in the computer 128 using a standard word processing program.

The auto dial function allows the electronic business card system 100 to dial phone numbers selected from records. When the auto dial function is utilized, a phone line is connected to the phone-in jack 120 and phone-out jack 122 of the electronic business card system 100, as well known in the art. Advantageously, the electronic business card system 100 records and stores the date and time of each dial operation for each record. The date and time are preferably stored in association with the corresponding record. Alternatively, when the electronic business card system 100 is connected to the computer 128, the computer 128 can accept the records marked for auto-dialing and the computer 128 can perform the auto-dial operation (assuming that the computer 128 is equipped with an appropriate modem). With the computer 128 providing the auto-dial function, the computer stores the date and time of the last dial operation with each associated record.

Figure 9:
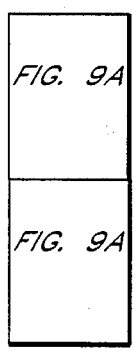
Figure 9A:
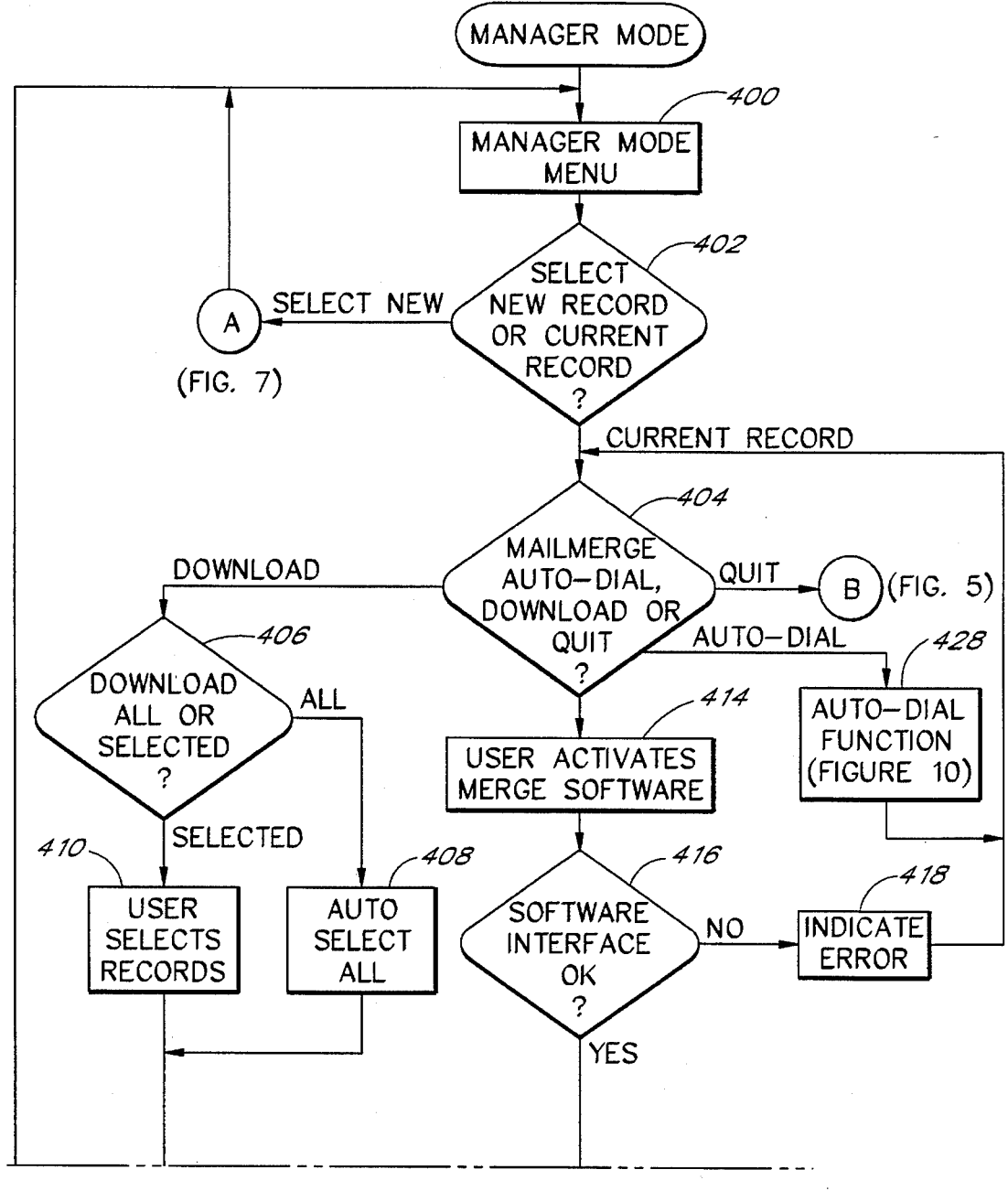

As discussed above, FIG. 9 provides additional details of the operation provided in the MANAGER MODE. Initially, the electronic business card system 100 displays the MANAGER MODE MENU, as represented in an activity block 400 (FIG. 4A). The MANAGER MODE MENU allows the user to select a new record or the current record for operation, as represented in a decision block 402. If the user desires to select a new category for operations, the electronic business card system 100 passes control to the examine records operations of FIGS. 7 and 8 via the continuation point A, and the user is allowed to select the examination category, parameter, or single record as disclosed above with respect to FIGS. 7 and 8. When the new selection is made, control returns to the MANAGER MODE menu (activity block 400, FIG. 9A).

If the user elects to perform operations in the MANAGER MODE on the current record or selected group of records as marked in operations during DISPLAY MODE, the user is provided with the option to execute a mail merge, to execute an auto dial function or to download the records to the computer 128, as represented in a decision block 404. Alternatively, the user can quit. If the user decides to terminate operations with a quit command, the electronic business card system 100 executes quit operations as discussed above with respect to FIG. 5, via continuation point B.

Figure 9B:
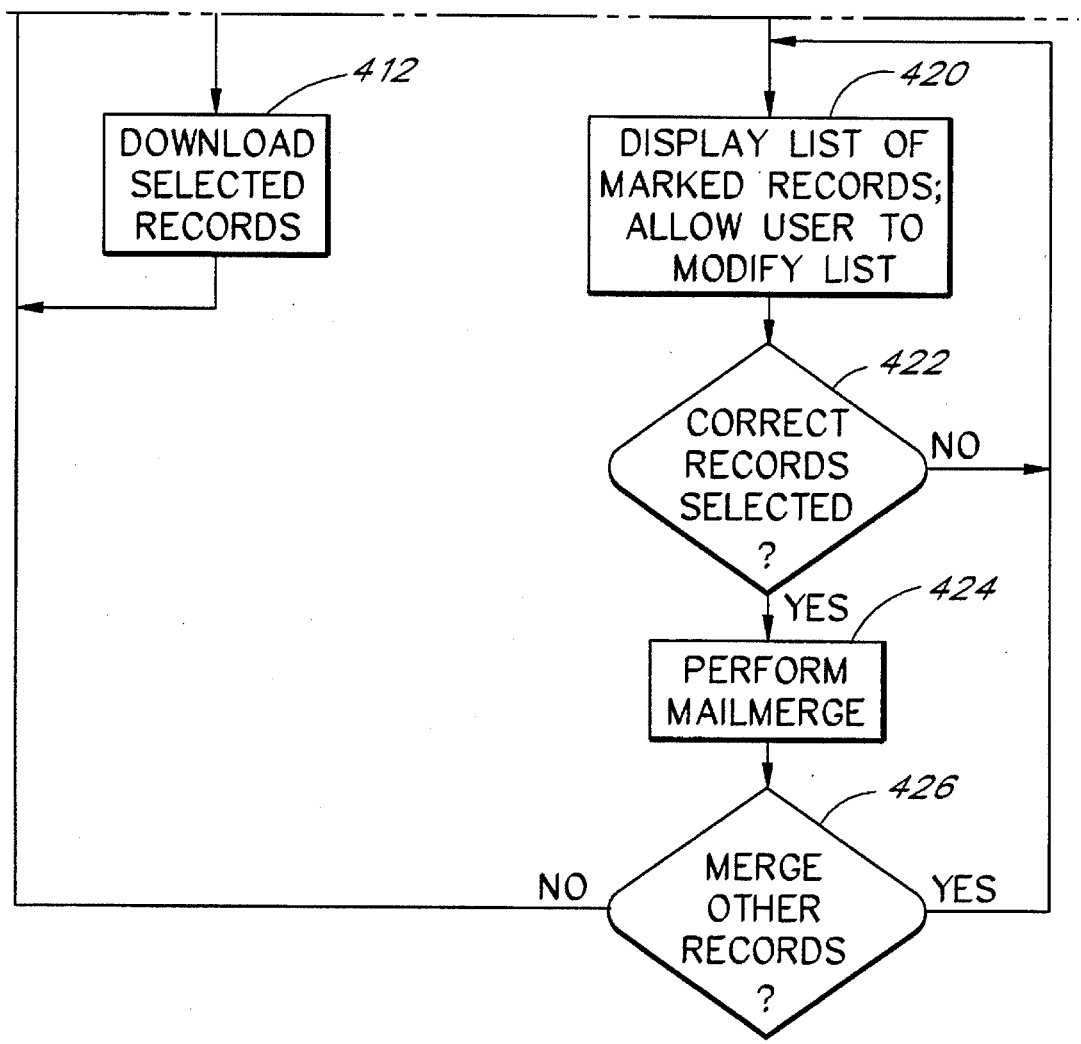

If the user elects to download marked records to the computer 128, the user is provided with the option to download all marked records or selected records which were marked during DISPLAY MODE operation as represented in a decision block 406. If the user elects to download all marked records to the computer 128, the electronic business card system 100 automatically selects all records, as represented in an activity block 408. Alternatively, if the user elects to select a portion of the marked records for transfer to the computer 128 (decision block 406), the user is allowed to select a subset of the marked records for transfer to the computer 128, as represented in an activity block 410. Once a selection is made, the electronic business card system 100 downloads the selected records to the connected computer 128, as represented in the activity block 412 (FIG. 9B).

As part of the downloading operation, the electronic business card system 100 checks and monitors the computer interface 112 to assure that the interface 112 is functioning properly. The protocol for the transfer depends upon the particular interface used and the type of computer 128 connected to the electronic business card system 100. Transfer operations between computers are well understood in the art. Advantageously, the computer 128 makes a separate directory for each category of records transferred. If the computer 128 contains duplicates of the records being transferred, the personal computer only updates those records that have changes. The computer 128 is advantageously programmed to provide all the MANAGER MODE, DISPLAY MODE, DATA MODE, and other operations that the electronic business card system 100 provides.

If the user elects to execute a mail merge function (decision block 404, FIG. 9A), the user is directed to first activate the mail merge software running on the personal computer or on the electronic business card system 100, depending upon the manner in which the merge will be completed, as represented in an activity block 414. In other words, if the merge is executed entirely within the electronic business card system 100 (for example, when the letters are input into the electronic business card system 100), the software need only be activated with the electronic business card system 100. However, if a merge involves the use of mail merge software or word processing software operating at the computer 128, the user activates the software operating on the computer 128 which will accept the business information from the electronic business card system 100 in order to merge that information with the letters or the like which are generated by the computer 128.

In the embodiment where an interface is utilized between the electronic business card system 100 and the computer 128 in order to complete the merge, the electronic business card system 100 checks the interface between the electronic business card system 100 and the computer 128, as represented in a decision block 416. If the interface (software or hardware are) is not fully functional, the electronic business card system 100 provides an error indication, as represented in an activity block 418. The user is again given an opportunity to select between mail merge, auto dial, and/or download operations. If the software interface is fully functional (decision block 416), the electronic business card system 100 then displays a list of all records marked for mail merge, as represented in an activity block 420 (FIG. 9B). In addition, the user is allowed to modify the list and send all or a subset of the records marked for mail merge. The electronic business card system 100 then queries the user whether all the correct records have been selected for the mail merge operation, as represented in a decision block 422. If the user indicates that not all records have been properly selected, the records are again displayed; and the user is allowed to modify the list, as represented in the activity block 420.

Once the user indicates that the correct records have been selected for mail merge (decision block 422), the electronic business card system 100 performs the mail merge operation. In essence, the electronic business card system 100 merges the information or provides the information such as the name, title, company, address, city, state, and ZIP code to the computer 128; and the computer 128 provides the information to the mail merge software. The function of performing the mail merge is represented in an activity block 424 of FIG. 9B. In one embodiment, the mail merge is accomplished through an interface to a standard word processing mail merge program.

Once all records selected have been merged, the electronic business card system 100 prompts the user to indicate whether other merges are desired, as represented in a decision block 426. If the user selects to merge other records, the electronic business card system 100 displays the list of all marked records and allow the user to modify the list once again. The mail merge operations of activity block 420–426 repeat. If the user indicates that no other records are desired for mail merge, control returns to the MANAGER MODE MENU (activity block 400, FIG. 9A).

Figure 10:
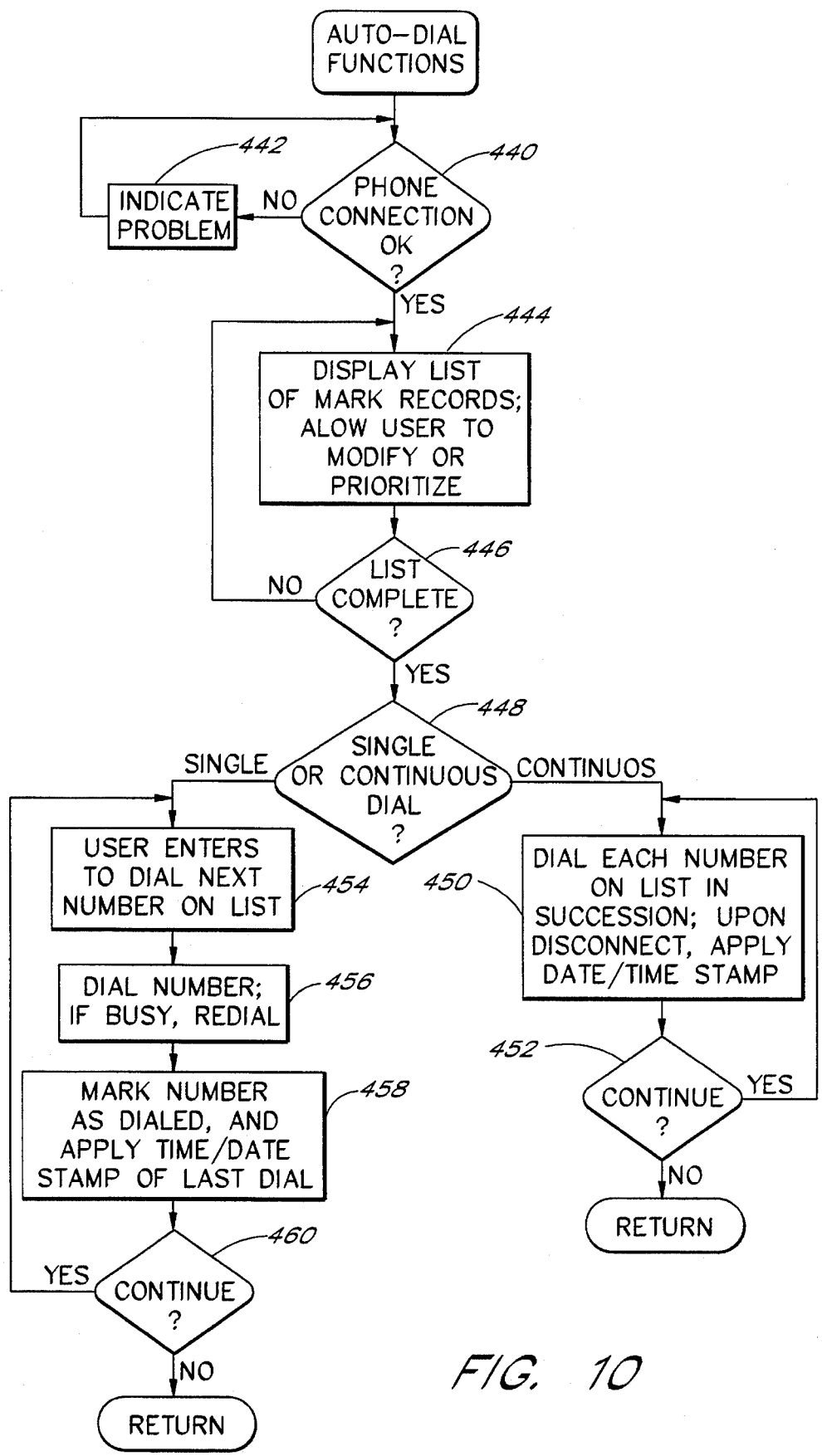

If the user elects to perform an auto dial function with marked records (decision block 404), the electronic business card system 100 performs the auto dial functions further represented in FIG. 10, as represented in the activity block 428.

In executing auto dial functions, the electronic business card system 100 first checks its telephone connection, as represented in a decision block 440. If the telephone connection is not functioning properly, the electronic business card system 100 indicates the problem to the user on the display 110, as represented in an activity block 442. If the phone connection is determined to be functional (decision block 440), the electronic business card system 100 displays the list of all records marked for the auto dial function (phone list), as represented in an activity block 444. The user is also allowed to modify or to prioritize the records on the list. The electronic business card system 100 then queries the user to indicate whether the list, as modified, is complete, as represented in a decision block 446. If the list is not complete, the list is again displayed and the user is allowed to modify or prioritize those records marked for auto dial, as represented in the action block 444.

Once the user indicates that the list is complete and accurate, the electronic business card system 100 prompts the user to indicate whether the user desires single- or continuous-dial operations, as represented in a decision block 448. If the user elects continuous-dial operations, the electronic business card system 100 then dials each number on the list, in succession, and transfers the business card information upon a successful connection. The electronic business card system 100, or the computer 128 as the case may be, applies the date/time stamp of the time of the last call for each record, as represented in an activity block 450. Upon final disconnect, the electronic business card system 100 prompts the user to indicate whether or not the user desires to continue, as represented in a decision block 452. Once the user indicates completion of the auto dial function, the user is again provided with the menu to allow the user to perform mail merge, auto dial, or download operations (decision block 404, FIG. 9).

If the user elects to perform single-dial operations (decision block 448, FIG. 10), the electronic business card system 100 waits for the user to indicate to dial the next number on the list, as represented in an activity block 454. The electronic business card system 100 then dials the number (and redials the number several times if the number is busy), as represented in an activity block 456. In the preferred embodiment, the number of times the electronic business card system 100 redials upon receiving a busy signal is selectable by the user. Once the number is successfully dialed, or the maximum number of redials have been completed, the record is either marked as dialed or as unsuccessful, as represented in an activity block 458. In the preferred embodiment, the electronic business card system 100 (or the computer 128 as the case may be) stores the date and time of the last dial for each record.

Upon completion of each individual dial operation, the user is prompted to continue or to return, as represented in a decision block 460. If the user decides to continue, the user indicates to the electronic business card system 100 to dial the next number on the list (activity block 454). These operations continue until all numbers on the auto dial list have been completed or the user elects to discontinue dialing. Once the user determines that dialing is completed, control returns to the menu which allows the user to elect mail merge, auto dial, or download operations (decision block 404, FIG. 9).

It should be understood that the computer 128 can be programmed to provide all of the MANAGER MODE, DISPLAY MODE, and DATA MODE operations that are provided by the electronic business card system 100. Accordingly, the computer 128 can be utilized interchangeably with the electronic business card system 100 once the electronic business card data has been entered. Similarly, in a configuration where the computer 128 is connected directly to the card reader 116, without the independent portable electronic business card system 100, the computer 128 executes the necessary applications programs and utilizes the card reader 116 to obtain data from electronic business cards 136.

In addition, although the functions have been described in terms of the depicted flow charts, similar functions could be provided with a different overall flow. Also, the system as described relates to business cards; however, the present invention also has applicability to other information bearing cards. The system has also been described with respect to a card bearing the computer readable data. However, the data could also be provided with other memory devices. Finally, it should also be understood that in any embodiment of the electronic business card system having a keyboard with alphanumeric capability, the user can manually enter business card data to form records.

Therefore, although the present invention has been described in terms of certain preferred embodiments, other embodiments are also incorporated within the scope of the present invention. Accordingly, the present invention has applicability beyond the particular embodiments described above. The scope of the present invention is defined by reference to the appended claims and not by the particular embodiments described above.

What is claimed is:

1. A self-contained, hand-held sized portable electronic information card system configured to receive data from an information card bearing computer readable data stored on a computer readable data storage media, said electronic information card system comprising:

a card reader configured to accept said information card and read said computer readable data;

a controller coupled to said card reader to form said self-contained, hand-held sized portable electronic information card system; and means for selecting between a non-display data input mode and a display data input mode, wherein in said non-display data input mode, the electronic information card system accepts data without displaying said data.

2. The self-contained, hand-held sized, portable electronic information card system of claim 1, wherein said information card comprises a business card and said computer readable data comprises data representing business information.

3. The self-contained, hand-held sized, portable electronic information card system of claim 2, wherein said electronic information card system has a business classification module which operates with said controller to organize business data for a predetermined business name.

4. The self-contained, hand-held sized, portable electronic information card system of claim 3, wherein said predetermined business name comprises at least one of lawyers, doctors, education professionals, military personnel, government personnel, or executives.

5. The self-contained, hand-held sized, portable electronic information card system of claim 1, further comprising:

a permanent memory coupled to said controller, and configured to receive said computer readable data from said controller for permanent storage.

6. The self-contained, hand-held sized, portable electronic information card system of claim 5, further comprising:

a user data interface coupled to said controller; and a communications interface to a separate computer system, said separate computer system adapted to receive said computer readable data from said controller and store said computer readable data on a permanent storage media of said separate computer.

7. The self-contained, hand-held sized, portable electronic information card system of claim 6, wherein said user data interface comprises a keyboard.

8. The self-contained, hand-held sized, portable electronic information card system of claim 5, further comprising:
   a keyboard coupled to said controller; and
   a communications interface to a communications line, said communications interface adapted to accept said computer readable data from said controller to transfer said computer readable data to an independent data storage device.

9. The self-contained, hand-held sized, portable electronic information card system of claim 8, wherein said communications interface comprises a modem with a telephone line interface.

10. The self-contained, hand-held sized, portable electronic information card system of claim 1, further comprising:
    a keyboard coupled to said controller, said keyboard having a sufficient number of keys to allow a user to manually enter business card information; and
    a manual data entry module, said manual data entry module responsive to the entry of business card information to generate a business card entry.

11. The self-contained, hand-held sized, portable electronic information card system of claim 1, further comprising:
    an audio responsive unit coupled to said controller, said audio responsive unit configured to receive audio information; and
    an audio information storage unit coupled to said controller and to said audio responsive unit to receive and store said audio information.

12. A self-contained, hand-held sized, portable electronic business card system configured to receive data from a business card bearing computer readable data stored on computer readable storage media, said electronic business card system comprising:
    a card reader configured to accept said business card and read said computer readable data;
    a controller coupled to said card reader to form said self-contained, hand-held sized portable electronic business card system, said controller configured to receive said computer readable data from said card reader and to permanently store said computer readable data;
    means for selecting between a non-display data input mode and a display data input mode, wherein in said non-display data input mode, the electronic information card system accepts data without displaying said data; and
    an information organization module, said controller being responsive to said information organization module to store said business card information so as to be accessible based on one or more of a plurality of organizational parameters.

13. The electronic business card system of claim 12, wherein said plurality of organizational parameters are selected from a group consisting of: a name, an address, a telephone number, an area code, and a ZIP code.

14. The electronic business card system of claim 12, further comprising:
    a keyboard coupled to said controller;
    a display coupled to said controller;
    a data modification module, said controller responsive to said data modification module to allow a user of said electronic business card system to modify said computer readable data with said keyboard, said data modification module further configured to display the modifications made by said user.

15. The electronic business card system of claim 12, further comprising:
    an audio responsive unit coupled to said controller, said audio responsive unit configured to receive audio information; and
    an audio information storage unit coupled to said controller and to said audio responsive unit to receive and store said audio information.

16. The electronic business card system of claim 12, further comprising:
    a telephone interface coupled to said controller; and
    an auto-dial and record transfer module, said controller responsive to said auto-dial and record transfer module to dial preselected telephone numbers utilizing said telephone interface.

17. The electronic business card system of claim 16, wherein said telephone interface comprises a modem.

18. A self-contained, portable electronic information card system configured to receive data from an information card bearing computer readable data stored on a computer readable data storage media, said electronic information card system comprising:
    a card reader configured to accept said information card and read said computer readable data;
    a controller coupled to said card reader to form said self-contained, portable electronic information card system; and
    a selection module responsive to input from a user to select between a non-display data input mode and a display data input mode, wherein in said non-display data input mode, the electronic information card system accepts data without displaying said data.

* * * * *